United States Patent [19]

Swedo

[11] 4,424,169

[45] Jan. 3, 1984

[54] PREPARATION OF SURFACTANTS

[75] Inventor: Raymond J. Swedo, Mount Prospect, Ill.

[73] Assignee: UOP Inc., Des Plaines, Ill.

[21] Appl. No.: 411,214

[22] Filed: Aug. 25, 1982

[51] Int. Cl.$^3$ .............. C07C 143/24; C07C 143/52; C07C 143/42
[52] U.S. Cl. .................. 260/505 R; 260/505 A; 260/505 S; 260/507 R; 260/512 R; 260/512 C; 208/11 R
[58] Field of Search ........... 260/505 R, 507 R, 512 R, 260/505 S, 505 A, 512 C; 208/11 R

[56] References Cited

U.S. PATENT DOCUMENTS 4,177,207  12/1979  Nussbaum et al. ............. 260/505 R

*Primary Examiner*—Alan Siegel
*Attorney, Agent, or Firm*—James R. Hoatson, Jr.; Raymond H. Nelson; William H. Page, II

[57] ABSTRACT

Surfactants, or surface active agents, may be prepared by treating oil shale with an aromatic compound such as benzene, toluene, etc. in the presence of a Friedel Crafts catalyst such as aluminum chloride at temperatures up to the reflux temperature of the aromatic compound. Thereafter, the alkylated product is separated from any excess aromatic compound and oil shale, sulfonated by treatment with a sulfonating agent such as sulfur trioxide and neutralized to produce the desired surfactant.

7 Claims, No Drawings

4,424,169

PREPARATION OF SURFACTANTS

BACKGROUND OF THE INVENTION

Surfactants or surface active agents are compounds which effect, usually in the form of reducing, surface tension between two liquids usually when dissolved in water or water solutions. While soap is considered a surface active agent, the usual surfactant comprises an organic derivative such as a sodium salt of high molecular weight alkyl sulfates or sulfonates. The surfactants are used as detergents, wetting agents, penetrants, spreaders, dispersing agents or foaming agents. Therefore, such compounds find a wide variety of uses in many commercial applications. One such application is in enhanced oil recovery where after obtaining as much petroleum as possible due to natural sources such as pressure either by the petroleum itself or by the presence of gases, the residual petroleum still present in the reservoir is recovered by a secondary process. The secondary process usually involves forcing water into the reservoir to provide the pressure necessary to force the petroleum from the reservoir to the surface. However, at some point in the recovery of petroleum, a state is reached in which it is more costly to use the water pumped into the reservoir relative to the amount of oil which is recovered by this method. It is therefore necessary to effect the recovery of any petroleum which may still be present in the reservoir, either in a pool or by being trapped in interstices of relatively porous rock, by a tertiary method. One particular means for effecting the tertiary method is by utilizing surfactants as a plug, whereby the oil or petroleum which is present in the reservoir may be recovered by injecting an aqueous fluid containing a surfactant or a combination of surfactants along with other compounds into the reservoir. The use of surfactants in this system is necessary inasmuch as water alone does not displace the petroleum with a relatively high degree of efficiency. This occurs due to the fact that water and oil are relatively immiscible and, in addition, the interfacial tension between water and oil is relatively high. The use of surfactants will lower or reduce the interfacial tension between the water and the oil, thus reducing the force which retains the oil which has been trapped in capillaries, and will thus enable the oil to be recovered in a more efficient manner.

As will hereinafter be shown in greater detail, I have now discovered that compounds which possess excellent surfactant properties may be prepared by treating oil shale to produce the aforesaid compound.

BRIEF SUMMARY OF THE INVENTION

This invention relates to a process for producing surfactant materials. More specifically, the invention is concerned with a process for preparing compounds which possess surfactant properties utilizing, as a source for one component of the compound, material which is abundant in nature and, due to its ready availability, will lower the overall cost of the desired product.

As was previously set forth, surfactants or surface active agents will find a wide variety of uses in industrial applications, while many surfactants must, of necessity, be colorless in nature due to a requirement for appearance. In some instances this appearance or product appearance is unimportant. Such applications would include the use of the surfactant in enhanced oil recovery or in lubrication.

It is therefore an object of this invention to provide a process for the preparation of surfactants.

A further object of this invention is found in a process for preparing surfactants utilizing readily available material as the source for one component thereof.

In one aspect, an embodiment of this invention resides in a process for the preparation of a surfactant which comprises treating oil shale with an aromatic compound in the presence of a Friedel Crafts catalyst at reaction conditions, separating the resultant alkylated product from the residual oil shale and excess aromatic compound, treating said product with a sulfonating agent at sulfonating conditions, neutralizing the sulfonated product, and recovering the resultant surfactant.

A specific embodiment of the invention resides in a process for the preparation of a surfactant which comprises treating oil shale with benzene in the presence of aluminum chloride at a temperature in the range of from about 50° C. up to about the reflux temperature of said benzene and a pressure in the range of from about atmospheric to about 50 atmospheres, separating the resultant alkylated benzene from the residual oil shale and excess benzene, treating the product with sulfur trioxide at a temperature in the range of from about ambient to about 50° C. and a pressure in the range of from about atmospheric to about 10 atmospheres, neutralizing the sulfonated product with sodium hydroxide and recovering the resultant surfactant.

Other objects and embodiments will be found in the following further detailed description of the present invention.

DETAILED DESCRIPTION OF THE INVENTION

As hereinbefore set forth, the present invention is concerned with a process for the preparation of surfactants or surface active agents utilizing oil shale as one of the starting materials. Oil shale which is in the form of a rock is readily available by mining in many areas of the country. The oil shale, in order to obtain valuable products therefrom, is usually subjected to a retort process at elevated temperatures which may range from about 800° to about 1000° F. The product which is obtained from this treatment comprises a crude black oil which is also known as shale oil, which then may be subjected to conventional means of refining in order to obtain the desired products such as gasoline, petrochemicals, fuel oil, etc. I have now discovered that oil shale can be subjected to what might be termed an alkylative extraction process to obtain a product which, after sulfonation and neutralization, may be utilized as a surfactant or surface active agent. In addition, by effecting this extraction reaction in the presence of certain catalytic compositions of matter of the type hereinafter set forth in greater detail, it is possible to obtain more than 1% by weight of extractable oil which is the usual amount obtained from the oil shale when using an organic solvent. In addition, this reaction may also be beneficial in nature and may actually make retorting more efficient in a manner similar to the pretreatment of coal under similar conditions which results in the subsequent liquefaction and/or gasification of the coal in a more efficient manner.

The treatment of the oil shale is effected by reacting the oil shale with an aromatic compound at treatment conditions in the presence of a Friedel Crafts metal halide catalyst. The reaction conditions which are employed to effect the desired reaction will include temperatures which may range from about 50° C. up to the reflux temperature of aromatic hydrocarbon which is used in the reaction and pressures which may range from about atmospheric to about 50 atmospheres. In the event that superatmospheric pressures are employed, the desired reaction pressure may be obtained by the introduction of an inert gas such as nitrogen, argon, helium into the pressure-resistant apparatus which is employed for the reaction. However, in the preferred embodiment of the invention, the desired reaction is effected at atmospheric pressure, thus enabling the desired reaction to be effected in a more economical manner due to the use of relatively more simple apparatus.

The aromatic compounds which are employed in the present process will preferably comprise unsubstituted or monoalkylated aromatic hydrocarbons which may be monocyclic or polycyclic in nature. Examples of unsubstituted aromatic hydrocarbons which may be employed will include benzene, naphthalene, chrysene, phenanthrene, etc., monoalkylated aromatic hydrocarbons in which the alkyl substituent may contain from 1 to 12 carbon atoms in length such as toluene, ethylbenzene, propylbenzene, butylbenzene, pentylbenzene, hexylbenzene, heptylbenzene, octylbenzene, nonylbenzene, decylbenzene, undecylbenzene, dodecylbenzene, the corresponding substituted naphthalenes, chrysenes, phenanthrenes, etc. It is also contemplated within the scope of the invention that other aromatic compounds such as diphenylmethane, 1,2-diphenylethane, 1,3-diphenylpropane, 1,4-diphenylbutane, biphenyl or phenyl ether may also be employed, although not necessarily with equivalent results.

The alkylative extraction of the oil shale is effected in the presence of a catalyst comprising a Friedel Crafts metal halide. For purposes of the present invention, the term "metal halide" as used in the present specification and appended claims will be taken to include boron, which is a metalloid rather than a metal. Specific examples of the metal halide catalyst which may be used will include aluminum chloride, aluminum bromide, zinc chloride, ferric chloride, boron trifluoride, boron trichloride, etc. It is also contemplated within the scope of this invention that acid catalysts such as hydrofluoric acid and sulfuric acid may also be used, although not necessarily with equivalent results.

The preparation of the surfactant is accomplished in a 3-step process, the first step involving the reaction of the oil shale with the aromatic hydrocarbon in the presence of a catalyst of the type hereinbefore set forth; the second step involves the removal of the unreacted oil shale and excess aromatic hydrocarbon; while the third step involves the sulfonation and neutralization of the sulfonated product to produce the desired surfactant. The desired product may be obtained in either a batch or continuous type of operation. For example, when a batch type operation is employed, the oil shale and aromatic hydrocarbon which is to undergo alkylation are placed in an appropriate apparatus along with the desired catalytic composition of matter. In one embodiment, the apparatus may comprise a reaction flask provided with a condenser and stirring means. The mixture is then heated at a predetermined temperature which may range up to the reflux temperature of the aromatic hydrocarbon employed for a predetermined period of time which may range from about 1 to about 20 hours or more in duration. Upon completion of the desired reaction period, the mixture may then be treated with an acid to decompose the catalyst, and filtered to separate the oil shale from the liquid portion of the reaction mixture. If so desired, the oil shale may then be washed with water and the washings combined with the filtrate. After thorough extraction, the mixture is allowed to stand until the organic layer separates from the aqueous layer. After recovery of the organic layer, the unreacted aromatic hydrocarbon may be removed by conventional means such as distillation, and the alkylated product is recovered.

The sulfonation of the alkylated product may be accomplished by treating the alkylated product in an appropriate apparatus with a sulfonating agent such as liquid or gaseous sulfur trioxide, sulfuric acid, etc. in the presence of, if so desired, an organic solvent such as paraffins including pentane, hexane, heptane, etc. or cyclopentanes such as cyclopentane, methylcyclopentane, cyclohexane, etc. As one example of a sulfonation process, the alkylated product may be charged to a reaction flask along with the desired solvent and thereafter liquid or gaseous sulfur trioxide is also charged to the reaction apparatus under a nitrogen blanket. The addition of the sulfonating agent to the alkylated product may be effected at ambient temperature or temperatures slightly in excess of ambient, that is, up to about 50° C. over a relatively long period which may range from about 1 to about 10 hours or more in duration. Upon completion of the desired reaction period, the mixture may then be neutralized by the addition of an alkaline component such as ammonium hydroxide, sodium hydroxide, lithium hydroxide, magnesium hydroxide, calcium hydroxide, strontium hydroxide, ammonium carbonate, sodium carbonate, lithium carbonate, magnesium carbonate, calcium carbonate, strontium carbonate, etc. The addition of the alkaline component is effected until a pH in excess of 7 is reached, after which water is added to the reaction mixture along with an equal amount of an alcohol such as isopropyl alcohol. After thorough agitation, the mixture is then heated to a temperature in the range of from about 50° to about 75° C. for a predetermined period of time and is thereafter allowed to cool. The alkaline sulfate which separates upon cooling, is then removed by conventional means such as filtration, centrifugation, etc. and after the mixture is allowed to settle, it will separate into two layers. The lower aqueous/alcohol layer may then be extracted with an organic solvent such as hexane until the extracts are not colored. The upper organic layer along with the combined extract may then be washed with water which is added to the aqueous layer. Thereafter, the aqueous layer is allowed to evaporate to dryness or a drying means such as a steam bath is used to yield the neutralized sulfonated derivative of the alkylated product.

It is also contemplated within the scope of this invention that the desired surfactant may be prepared in a continuous manner of operation. When such a type of operation is employed, the quantity of the oil shale and aromatic hydrocarbon is continuously charged to a reaction vessel containing the catalyst, said reaction vessel being maintained at the proper operating conditions of temperature and pressure. After passage through the reactor for a predetermined period of time, the effluent is continuously withdrawn and the alkylated product is separated from unreacted aromatic hydrocarbon and unreacted oil shale. After separation, the alkylated product is continuously charged to a sulfonation zone which is also maintained at the proper operating conditions of temperature and pressure where it is contacted with a sulfonating agent such as liquid or gaseous sulfur trioxide. As in the previous step, after passage through this sulfonation zone for a predetermined period of time, the effluent is continuously withdrawn therefrom and passed to a third zone wherein it is contacted with a neutralization agent such as sodium hydroxide. After neutralization, the effluent from the third zone is continuously withdrawn and treated in a manner similar to that hereinbefore set forth whereby the desired neutralized sulfonate derivative of the alkylated product is separated and recovered.

The following examples are given for purposes of illustrating the process of this invention. However, it is to be understood that the examples are given merely for purposes of illustration and that the process of the present invention is not necessarily limited thereto.

EXAMPLE I

To illustrate the preparation of an alkylated product, a 10.0 gram sample of +14 mesh Green River formation oil shale was mixed with 1.5 grams of anhydrous aluminum chloride and 24 ml of toluene in a reaction apparatus provided with a reflux condenser. The mixture was heated to a temperature of about 110° C. and the mixture was refluxed for a period of 12 hours. At the end of this time, heating was discontinued and the mixture was allowed to stand at room temperature for an additional period of about 100 hours. Following this, the mixture was treated with 10 ml of concentrated hydrochloric acid and 20 ml of water to decompose the aluminum chloride. Thereafter, the mixture was filtered and the shale was washed with four portions of 50 ml of water and three portions of 40 ml of methylene chloride. The washings were combined with the filtrate, agitated and allowed to stand. The organic layer was then separated from the aqueous layer and the unreacted toluene was removed from the organic layer by means of rotary evaporation under reduced pressure to give a product comprising 0.3965 gram of a heavy black oil. This represented almost four times the conventional amount of extractable material inasmuch as the theoretical yield of extractable material from oil shale utilizing an organic solvent in the absence of a catalyst is 0.10 gram. The infra-red and nuclear magnetic resonance spectra of the product disclosed mostly di-substituted aromatic compounds.

EXAMPLE II

In this experiment, a 100.0 gram sample of +14 mesh Green River formation oil shale was mixed with 15.0 grams of anhydrous aluminum chloride and 240 ml of benzene in a reaction apparatus provided with heating and reflux means. The mixture was heated to a temperature of about 80° C. and refluxed for a period of 24 hours. Following the 24 hour period, heating was discontinued and the mixture was cooled to room temperature. The aluminum chloride was decomposed using 30 ml of a 1:1 concentrate hydrochloric acid-water mixture and the reaction mixture was filtered. The oil shale was again washed three times with 50 ml of water and five times with 75 ml of methylene chloride until the extract was colorless. As in the previous example, the washings were combined with the filtrate, extracted, and after allowing the mixture to stand, the organic layer and aqueous layer separated. The unreacted benzene was removed from the organic layer to give a yield of 5.41 grams of a brown-black tar. This yield was approximately 5.4 times the theoretical yield of organic extractable material, the theoretical yield being 1.0 grams. An infra-red analysis of this product disclosed a mono-substituted benzene along with carboxylic acid and ether functional groups. In addition, the oil shale which was recovered was dried under vacuum at room temperature and weighed, the treated material showing a gain of 5.55 grams.

EXAMPLE III

The 5.41 grams of tar which comprise the product resulting from the reaction of oil shale with benzene in Example II above was admixed with 100 ml of methylene chloride. The resulting solution was placed in a reaction flask provided with a reflux condenser and gas inlet tube. The solution was stirred while 2.90 grams of sulfur trioxide were introduced into the stirred solution from a separate bubbler, the addition being made through the gas inlet tube as a 5–10 vol. % mixture of sulfur trioxide in nitrogen. The addition of the sulfur trioxide was accomplished during a period of three hours at ambient temperature. Upon completing the addition of the sulfur trioxide, the mixture was sparged for an additional period of one hour with nitrogen.

The sulfonate mixture was neutralized to a pH of about 8 using a 50 wt. % aqueous sodium hydroxide solution. After neutralization, the methylene chloride was removed under vacuum and the resulting aqueous solution was filtered free of tars.

The aqueous filtrate which was obtained was diluted with an equal volume of isopropyl alcohol and after allowing the mixture to stand for a period of 18 hours, the solution was filtered to separate the sodium sulfate precipitate which had formed. The water and alcohol solvent was removed from the filtrate by evaporation on a steam bath to yield 4.58 grams of a brown solid sodium sulfonate derivative of the alkylated product.

EXAMPLE IV

To illustrate surfactant properties of this product, the interfacial tension measurements of the sodium sulfonate salt of the alkylated product were obtained by using the spinning drop technique as set forth in the article, "*Adsorption at Interfaces*" by J. L. Cayias, R. S. Schechter and W. H. Wade, ACS Symposium, Series No. 8, 1975, page 234. The solution which was used for the interfacial tension measurements comprised 0.70 gram per liter of the sodium sulfonate salt of the alkylated product, 20 ml per liter of the alcohol of the type hereinafter set forth and 10 grams per liter of sodium chloride. This solution was measured against a series of pure hydrocarbons, the results of these tests being set forth in Table I below.

TABLE I

| SURFACTANT PROPERTIES OF SODIUM SULFONATE DERIVATIVE | | |
|---|---|---|
| 0.70 g/l surfactant 20 ml/l alcohol 10 g/l NaCl | | Surfactant Test Solution |
| Alcohol | n-Alkane | IFT (dynes/cm) |
| iso-butyl | 6 | $1.8 \times 10^{-0}$ |
| | 8 | $1.7 \times 10^{-0}$ |
| | 10 | $3.0 \times 10^{-0}$ |
| | 12 | $1.3 \times 10^{-0}$ |
| | 14 | $1.2 \times 10^{-0}$ |
| | 16 | $2.9 \times 10^{-0}$ |
| n-butyl | 6 | $1.9 \times 10^{-0}$ |
| | 8 | $1.6 \times 10^{-0}$ |

TABLE I-continued
SURFACTANT PROPERTIES OF SODIUM SULFONATE DERIVATIVE

| 0.70 g/l surfactant<br>20 ml/l alcohol<br>10 g/l NaCl | Surfactant Test Solution | |
|---|---|---|
| Alcohol | n-Alkane | IFT (dynes/cm) |
|  | 10 | $1.6 \times 10^{-0}$ |
|  | 12 | $1.3 \times 10^{-0}$ |
|  | 14 | $1.4 \times 10^{-0}$ |
|  | 16 | $1.4 \times 10^{-0}$ |
| iso-amyl | 6 | $1.0 \times 10^{-0}$ |
|  | 8 | $8.5 \times 10^{-1}$ |
|  | 10 | $7.7 \times 10^{-1}$ |
|  | 12 | $5.7 \times 10^{-1}$ |
|  | 14 | $8.2 \times 10^{-1}$ |
|  | 16 | $7.9 \times 10^{-1}$ |
| iso-propyl | 6 | $2.3 \times 10^{-0}$ |
|  | 8 | $1.5 \times 10^{-0}$ |
|  | 10 | $1.4 \times 10^{-0}$ |
|  | 12 | $1.6 \times 10^{-0}$ |
|  | 14 | $1.1 \times 10^{-0}$ |
|  | 16 | $1.2 \times 10^{-0}$ |

I claim as my invention:

1. A process for the preparation of a surfactant which comprises treating oil shale with an aromatic compound in the presence of a Friedel Crafts catalyst at a temperature in the range of from about 50° C. up to the reflux temperature of said aromatic compound and a pressure in the range of from about atmospheric to about 50 atmospheres, separating the resultant alkylated product from the residual oil shale and excess aromatic compound, treating said product with a sulfonating agent selected from the group consisting of sulfur trioxide and sulfuric acid at a temperature in the range of from about ambient to about 50° C. and a pressure in the range of from about atmospheric to about 10 atmospheres, neutralizing the sulfonated product, and recovering the resultant surfactant.

2. The process as set forth in claim 1 in which said Friedel Crafts catalyst is aluminum chloride.

3. The process as set forth in claim 1 in which said Friedel Crafts catalyst is aluminum bromide.

4. The process as set forth in claim 1 in which said Friedel Crafts catalyst is boron trifluoride.

5. The process as set forth in claim 1 in which said aromatic compound is benzene.

6. The process as set forth in claim 1 in which said aromatic compund is toluene.

7. The process as set forth in claim 1 in which said aromatic compound is naphthalene.

* * * * *